United States Patent [19]

Yamanishi

[11] Patent Number: 5,422,938
[45] Date of Patent: Jun. 6, 1995

[54] TELEPHONE SET WITH PREDETERMINED PLURAL EDITING FUNCTIONS

[75] Inventor: Koji Yamanishi, Kasuga, Japan

[73] Assignee: Matsushita Electric Industrial Co., Ltd., Japan

[21] Appl. No.: 325,111

[22] Filed: Oct. 20, 1994

Related U.S. Application Data

[63] Continuation of Ser. No. 894,635, Jun. 5, 1992, abandoned.

[30] Foreign Application Priority Data

Jun. 7, 1991 [JP] Japan .................................. 3-136147

[51] Int. Cl.⁶ ...................... H04M 1/56; H04M 15/06
[52] U.S. Cl. .................................................. 379/142
[58] Field of Search ............... 379/142, 201, 245, 247, 379/354, 355

[56] References Cited

U.S. PATENT DOCUMENTS

| | | |
|---|---|---|
| 4,800,582 | 1/1989 | D'Agosto, III et al. ....... 379/354 X |
| 4,924,496 | 5/1990 | Figa et al. ............... 379/142 |
| 4,928,302 | 5/1990 | Kaneuchi et al. ............... 379/354 X |
| 4,980,910 | 12/1990 | Oba et al. ......................... 379/354 X |
| 5,121,423 | 6/1992 | Morihiro et al. .................... 379/142 |

Primary Examiner—Stephen Chin
Assistant Examiner—Paul Loomis
Attorney, Agent, or Firm—Parkhurst, Wendel & Rossi

[57] ABSTRACT

A telephone set includes a detector for detecting telephone number data coming from a telephone line, a store device for storing the telephone number data detected by the telephone number detector, and an editing unit for editing the telephone number data stored in the store device. The telephone set also includes a display for indicating the telephone number data edited by the editing unit, and a dial signal transmitter for generating a dial signal corresponding to the telephone number data edited by the editing unit, and for transmitting the dial signal to the telephone line.

15 Claims, 3 Drawing Sheets

TELEPHONE SET WITH PREDETERMINED PLURAL EDITING FUNCTIONS

This is a continuation of Ser. No. 894,635, filed Jun. 5, 1992, abandoned.

BACKGROUND OF THE INVENTION

1. Field of the Invention

This invention relates to a telephone set having both the function of recognizing the telephone number of a caller and the function of calling back the caller.

2. Description of the Prior Art

Some of telephone sets have the following additional functions. In cases where a telephone set is called, the telephone set recognizes the telephone number of the caller before answering the call. This function of the telephone set uses such services offered by an exchange that the exchange transmits data of the telephone number of the caller to the called party together with a call incoming signal. The telephone set has a memory for storing the telephone number of the caller. During the absence of the user of the telephone set, when the telephone set is called, the memory stores the telephone number of the caller. After the end of the absence, the user can call back the caller by referring to the caller telephone number stored in the memory.

According to caller telephone number transmission services (caller ID services) in the United States, caller telephone number data transmitted from an exchange contains an area code. In cases where the caller and the called party are in a same area, the area code needs to be deleted when the called party executes the call back process. In some cases, "1" needs to be appended to the head of the telephone number of the caller when the called party executes the call back process. Thus, editing the telephone number of the caller which is read out from the memory is actually executed in the called party.

According to a prior art method of editing the telephone number of the caller, digits of the telephone number sequence are erased, changed, or added one by one. Therefore, the prior art method tends to be complicated, and editing the telephone number usually spends a long time.

SUMMARY OF THE INVENTION

It is an object of this invention to provide an improved telephone set.

A first aspect of this invention provides a telephone set comprising means for detecting telephone number data coming from a telephone line; means for storing the telephone number data detected by the telephone number detecting means; means for editing the telephone number data stored in the storing means; means for indicating the telephone number data edited by the editing means; and means for generating a dial signal corresponding to the telephone number data edited by the editing means, and for transmitting the dial signal to the telephone line.

A second aspect of this invention provides a telephone set comprising means for detecting telephone number data coming from a telephone line; means for storing the telephone number data detected by the telephone number detecting means; a buffer memory for storing telephone number data which is being edited; means for editing the telephone number data stored in the buffer memory, wherein the editing means comprises means for selecting one of a plurality of different editing processes and means for executing one of the editing processes which is selected by the selecting means in an editing mode; means for inputting an editing instruction; means for, in a mode other than the editing mode, performing a change to the editing mode when the editing instruction is inputted via the inputting means; means for, in the editing mode, sequentially selecting one of the editing processes and executing the selected editing process on the telephone number data in the buffer memory each time the editing instruction is inputted via the inputting means; means for indicating a telephone number represented by the telephone number data stored in the buffer memory; and means for generating a dial signal corresponding to the telephone number data edited by the editing means, and for transmitting the dial signal to the telephone line.

A third aspect of this invention provides a telephone set comprising means for detecting telephone number data coming from a telephone line; means for storing the telephone number data detected by the telephone number detecting means; means for inputting an editing instruction; a buffer memory for storing telephone number data which is being edited; editing means for, in an editing mode, loading the buffer memory with the telephone number data stored in the storing means, and removing a portion of the telephone number data in the buffer memory in accordance with an editing operation, wherein an unremoved portion of the telephone number data in the buffer memory corresponds to telephone number digits in a given number of successive places starting from a lowest place while the removed portion of the telephone number data in the buffer memory corresponds to telephone number digits in other places; means for indicating a telephone number represented by the telephone number data stored in the buffer memory; and means for generating a dial signal corresponding to the telephone number data edited by the editing means, and for transmitting the dial signal to the telephone line in response to a dial signal transmitting instruction.

A fourth aspect of this invention provides a telephone set comprising means for detecting telephone number data coming from a telephone line; means for storing the telephone number data detected by the telephone number detecting means; means for inputting an editing instruction; a buffer memory for storing telephone number data which is being edited; editing means for, In an editing mode, loading the buffer memory with the telephone number data stored in the storing means, and adding given digit data to a head of the telephone number data stored in the buffer memory in accordance with an editing operation; means for indicating a telephone number represented by the telephone number data stored in the buffer memory; and means for generating a dial signal corresponding to the telephone number data edited by the editing means, and for transmitting the dial signal to the telephone line in response to a dial signal transmitting instruction.

A fifth aspect of this invention provides a telephone set comprising means for detecting telephone number data coming from a telephone line; means for storing the telephone number data detected by the telephone number detecting means; means for inputting an indicating instruction and an editing instruction; a buffer memory for storing telephone number data which is being edited; editing means for, in an editing mode, loading the buffer memory with the telephone number data stored in the storing means in accordance with an indicating instruction, and executing an editing process on the telephone number data stored in the buffer memory in accordance with an editing operation; means for indicating a telephone number represented by the telephone number data stored in the buffer memory; and means for generating a dial signal corresponding to the telephone number data edited by the editing means, and for transmitting the dial signal to the telephone line in response to a dial signal transmitting instruction.

A sixth aspect of this invention provides a telephone set comprising means for detecting telephone number data coming from a telephone line; means for storing the telephone number data detected by the telephone number detecting means; means for inputting an indicating instruction and an editing instruction; means for editing telephone number data; a buffer memory for storing telephone number data which is being edited; means for indicating a telephone number represented by the telephone number data stored in the buffer memory; and means for generating a dial signal corresponding to the telephone number data edited by the editing means, and for transmitting the dial signal to the telephone line in response to a dial signal transmitting instruction; wherein the editing means comprises first sub means for loading the buffer memory with the telephone number data stored in the storing means and performing a change to an editing mode in accordance with an indicating instruction, second sub means for removing a portion of the telephone number data in the buffer memory, wherein an unremoved portion of the telephone number data in the buffer memory corresponds to telephone number digits in a given number of successive places starting from a lowest place while the removed portion of the telephone number data in the buffer memory corresponds to telephone number digits in other places, third sub means for adding given digit data to a head of the telephone number data which remains in the buffer memory after the removing function by the second sub means, fourth sub means for adding given digit data to a head of the telephone number data which is stored in the buffer memory before the removing function by the second sub means, fifth sub means for returning the telephone number data in the buffer memory which is processed by the functions of the second, third, and fourth sub means to the data which occurs before the execution of the functions of the second, third, and fourth sub means, and a fifth sub means for sequentially executing the functions of the second, third, fourth, and fifth sub means in accordance with an editing operation.

A seventh aspect of this invention provides a telephone set comprising means for detecting a caller telephone number from an incoming signal; means for storing the caller telephone number detected by the detecting means; means for reading out the caller telephone number from the storing means; and means for editing the readout caller telephone number by at least two digits at once.

An eighth aspect of this invention provides a telephone set comprising means for detecting a caller telephone number from an incoming signal; and means for editing the detected caller telephone number by at least two digits at once.

A ninth aspect of this invention provides a telephone set comprising means for detecting a caller telephone number from an incoming signal; means for storing the caller telephone number detected by the detecting means; means for reading out the caller telephone number from the storing means; means for editing the readout caller telephone number in an editing way changeable among at least two predetermined ways; a button; and means for sequentially changing the editing way among the predetermined ways in response to a depression of the button.

DESCRIPTION OF THE PREFERRED EMBODIMENT

Figure 1:
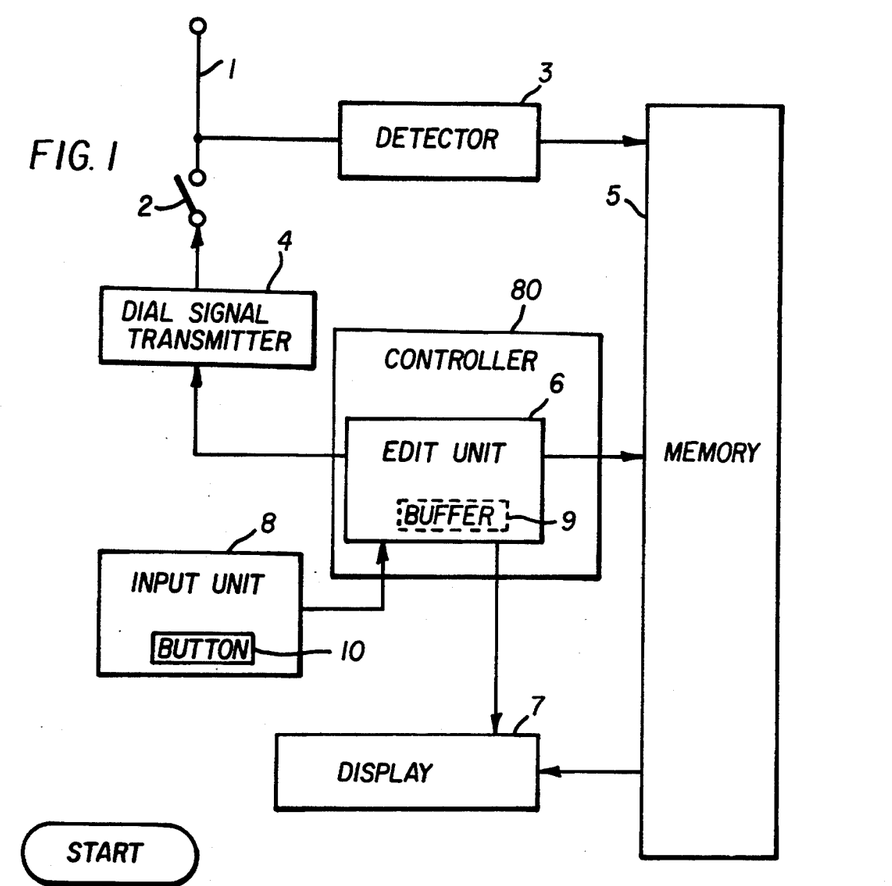
FIG. 1 is a block diagram of an electric circuit in a telephone set according to an embodiment of this invention.

With reference to FIG. 1, a telephone set includes a detector 3, a dial signal transmitter 4, a memory 5, a display 7, an input unit 8, and a controller 80. An editing unit 6 is provided in the controller 80. The controller 80 is connected to the input unit 8. The controller 80 receives signals from the input unit 8 which represents instructions given by the user. The controller 80 is also connected to the other devices 3, 4, 5, and 7. The controller 80 controls the devices 3, 4, 5, and 7 and receives the signals from the devices 3, 4, 5, and 7. The controller 80 includes a microcomputer, a signal processor, or another similar device, which has a combination of a processing section, a ROM, a RAM, and an I/O section. The controller 80 operates in accordance with a program stored in the ROM.

The detector 3 is connected between a telephone line 1 and the memory 5. The detector 3 receives a signal from the telephone line 1, and detects the telephone number of a caller which is represented by a given portion of the received signal. The detector 3 generates data representative of the detected telephone number of the caller, and stores the caller telephone number data into the memory 5. Each time the detector 3 receives such an incoming signal, the detector generates related caller telephone number data and stores the caller telephone number data into the memory 5. Thus, the memory 5 holds information of telephone numbers of callers related to previous incoming signals. The memory 5 has a given number of different areas which serve to memorize caller telephone numbers related to previous incoming signals respectively.

The dial signal transmitter 4 is connected to the telephone line 1 via a hook switch 2. The dial signal transmitter 4 is also connected to the editing unit 6. The dial signal transmitter 4 receives an output signal of the editing unit 6 which represents a telephone number resulting from an editing process. The dial signal transmitter 4 generates a dial signal corresponding to the edited telephone number, and transmits the generated dial signal to the telephone line 1 provided that the hook switch 2 is closed.

The editing unit 6 is connected to the dial signal transmitter 4, the memory 5, the display 7, and the input unit 8. The editing unit 6 reads out caller telephone number data from the memory 5, and processes the readout caller telephone number data to edit the caller telephone number in accordance with a predetermined sequence. The RAM in the editing unit 6 forms a buffer (a buffer memory) 9 used for the editing process.

When the user instructs indicating caller telephone numbers by operating the input unit 8, the input unit 8 generates a corresponding instruction signal and outputs the instruction signal to the controller 80. The controller 80 controls the memory 5 and the display 7 in response to the instruction signal. During this control, caller telephone number data is transmitted from the memory 5 to the display 7, and telephone numbers of callers which are represented by the caller telephone number data are sequentially indicated on the display 7 in a designated order. The indicated telephone numbers of the callers relate to previous incoming signals respectively.

When the user instructs editing a caller telephone number by operating the input unit 8, the input unit 8 generates a corresponding instruction signal and outputs the instruction signal to the controller 80. The controller 80 controls the buffer 9 and the display 7 in response to the instruction signal. During this control, data representing a caller telephone number currently subjected to an editing process is held in the buffer 9, and the caller telephone number data is transmitted from the buffer 9 to the display 7 so that the caller telephone number currently subjected to the editing process is indicated on the display 7. The input unit 8 includes a push button 10. By actuating the push button 10, the user can instructs editing a caller telephone number.

Figure 4:
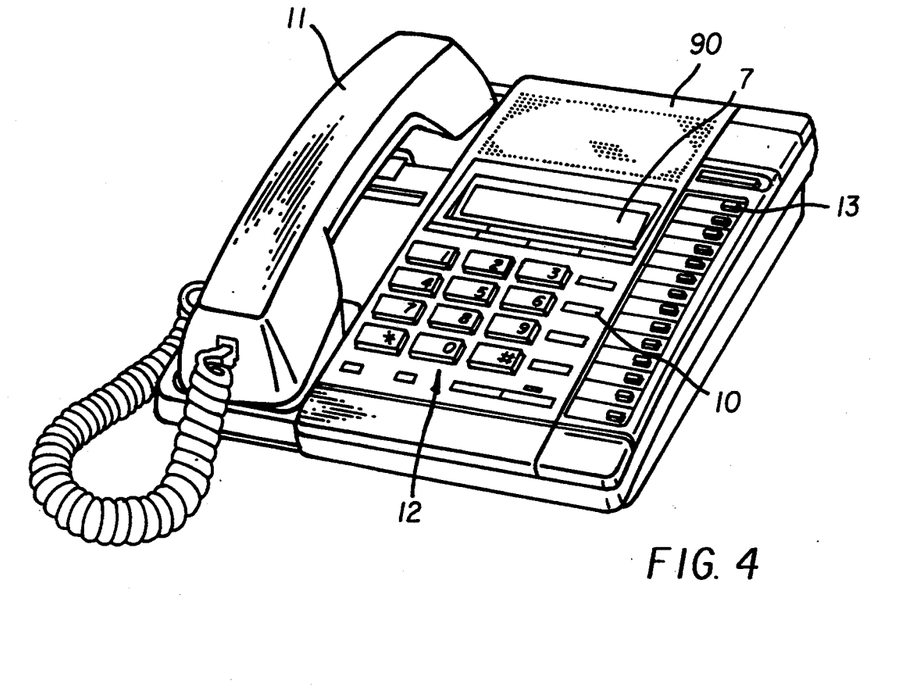
FIG. 4 is a perspective view of the telephone set according to the embodiment of this invention.

FIG. 4 is a perspective view of the telephone set. As shown in FIG. 4, the telephone set has a main body 90 and a hand set 11. When the hand set 11 is placed on the main body 90, the hook switch 2 of FIG. 1 is opened. When the hand set 11 is separated from the main body 90, the hook switch 2 of FIG. 1 is closed. The devices 3–8 of FIG. 1 are provided in the main body 90. As shown in FIG. 4, the main body 90 also has a ten-key arrangement 12 and another key arrangement 13. The user can execute manual dialing operation by actuating the ten-key arrangement 12. The user can execute automatic dialing operation by actuating the key arrangement 13.

Figure 5A:
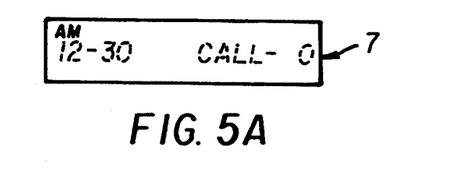
FIGS. 5A and 5B are plan views of the display of FIGS. 1 and 4.
Figure 5B:
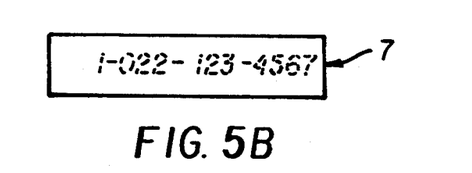

Under normal conditions, the controller 80 controls the display 7 so that the display 7 will indicate the current time as shown in FIG. 5A. Under the previously-mentioned special conditions (for example, the editing conditions), the controller 80 controls the display 7 so that the display 7 will indicate the telephone number of a caller as shown in FIG. 5B.

Figure 2:
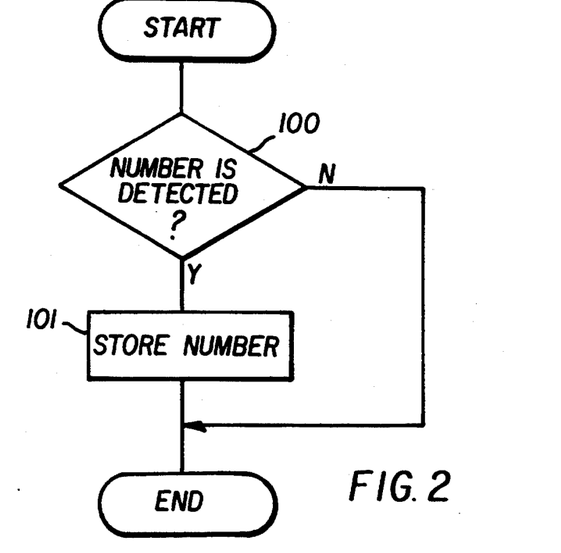
FIG. 2 is a flowchart of a segment of a program operating the controller of FIG. 1.

As described previously, the controller 80 operates in accordance with a program stored in the ROM. FIG. 2 is a flowchart of a segment of the program. This program segment is periodically reiterated. In addition, this program segment is generally executed during the absence of the user. As shown in FIG. 2, a first step 100 of the program segment decides whether or not the detector 3 detects the telephone number of a caller which is represented by a signal received from the telephone line 1. When the detector 3 does not detect the telephone number of a caller, the current execution cycle of the program segment ends. When the detector 3 detects the telephone number of a caller, the program advances from the step 100 to a step 101. The step 101 transmits caller telephone number data from the detector 3 to the memory 5, and stores the caller telephone number data into the memory 5. After the step 101, the current execution cycle of the program segment ends. In this way, each time an incoming signal is received, data representative of a caller telephone number related to the incoming signal is stored into the memory 5. Thus, caller telephone numbers related to previous incoming signals are sequentially memorized by memory 5.

Figure 3:
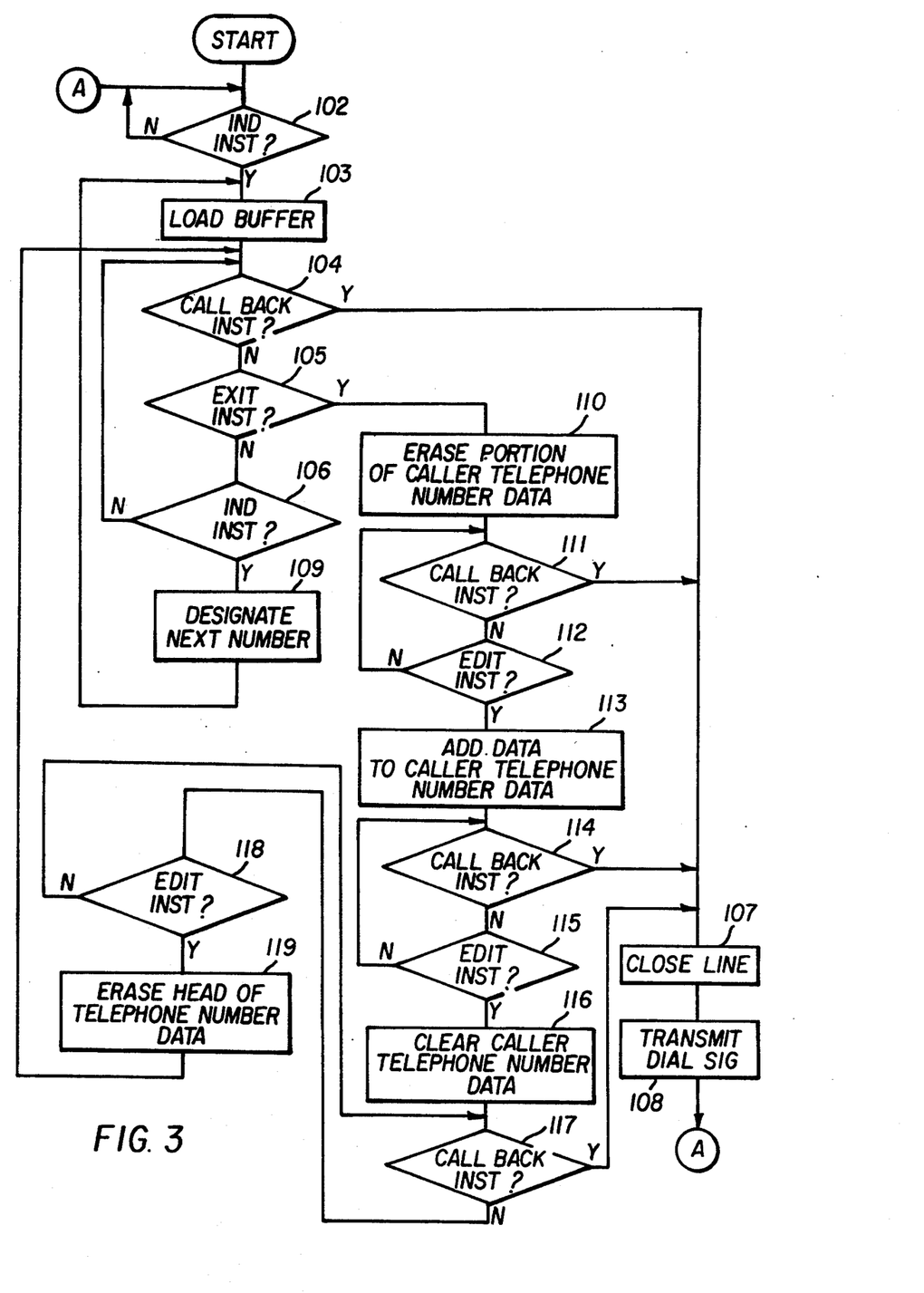
FIG. 3 is a flowchart of a program operating the editing unit of FIG. 1.

The editing unit 6 operates in accordance with a program stored in the ROM. FIG. 3 is a flowchart of this program. As shown in FIG. 3, a first step 102 decides whether user's instruction of indicating a caller telephone number is present or absent. When the indicating instruction is decided to be present, the program advances to a step 103. When the indicating instruction is decided to be absent, the step 102 is executed again.

The step 103 reads out caller telephone number data from a designated area of the memory 5, and writes the readout caller telephone number data into the buffer 9. At the same time, the caller telephone number represented by the data in the buffer 9 is indicated on the display 7 by the operation of the controller 80. During the first execution of the step 103, the designated area agrees with a first area of the memory 5. After the step 103, the program advances to a step 104.

The step 104 decides whether user's instruction of executing call back is present or absent. When the call back instruction is decided to be present, the program advances to a step 107. When the call back instruction is decided to be absent, the program advances to a step 105.

The step 105 decides whether user's instruction of editing the caller telephone number is present or absent. When the editing instruction is decided to be present, the program advances to a step 110. When the editing instruction is decided to be absent, the program advances to a step 106.

The step 106 decides whether an indicating instruction is present or absent. When the indicating instruction is decided to be present, the program advances to a step 109. When the indicating instruction is decided to be absent, the program returns to the step 104.

The step 109 updates the address or pointer which designates a memory area to be accessed next. Specifically, the step 109 newly designates an area of the memory 5 which is subsequent to the previously-designated area thereof. The designated memory area will be accessed in the step 103 executed after the step 109. After the step 109, the program returns to the step 103.

The step 110 executes a first editing process. Specifically, the step 110 removes or erases a portion of the caller telephone number data from the buffer 9. The remaining portion of the caller telephone number data represents caller telephone number digits in a given number of successive places starting from the lowest place. The removed portion of the caller telephone number data corresponds to caller telephone number digits in higher places. At the same time, the unremoved portion of the caller telephone number which is represented by the remaining data in the buffer 9, that is, the removal-resultant caller telephone number, is indicated on the display 7 by the operation of the controller 80. For example, the removal-resultant caller telephone number is "456-7890" in cases where the original caller telephone number is "123-456-7890". After the step 110, the program advances to a step 111.

The step 111 decides whether a call back instruction is present or absent. When the call back instruction is decided to be present, the program advances to the step 107. When the call back instruction is decided to be absent, the program advances to a step 112.

The step 112 decides whether an editing instruction is present or absent. When the editing instruction is decided to be present, the program advances to a step 113. When the editing instruction is decided to be absent, the program returns to the step 111.

The step 113 executes a second editing process. Specifically, the step 113 adds given data to the caller telephone number data in the buffer 9. The added data represents a prescribed digit, for example, "1". The prescribed digit is added to the higher side of the caller telephone number to modify the caller telephone number. At the same time, the caller telephone number which is represented by the resultant data in the buffer 9, that is, the modification-resultant caller telephone number, is indicated on the display 7 by the operation of the controller 80. For example, the modification-resultant caller telephone number is "1-456-7890" in cases where the preceding caller telephone number is "456-7890". After the step 113, the program advances to a step 114.

The step 114 decides whether a call back instruction is present or absent. When the call back instruction is decided to be present, the program advances to the step 107. When the call back instruction is decided to be absent, the program advances to a step 115.

The step 115 decides whether an editing instruction is present or absent. When the editing instruction is decided to be present, the program advances to a step 116. When the editing instruction is decided to be absent, the program returns to the step 114.

The step 116 executes a third editing process. Specifically, the step 116 clears the caller telephone number data from the buffer 9, and reads out caller telephone number data from the designated area of the memory 5 and writes the readout caller telephone number data into the buffer 9. Then, the step 116 adds given data to the caller telephone number data in the buffer 9. The added data represents a prescribed digit, for example, "1". The prescribed digit is added to the higher side of the caller telephone number to modify the caller telephone number. At the same time, the caller telephone number which is represented by the resultant data in the buffer 9, that is, the modification-resultant caller telephone number, is indicated on the display 7 by the operation of the controller 80. For example, the modification-resultant caller telephone number is "1-123-456-7890" in cases where the preceding caller telephone number is "123-456-7890". After the step 116, the program advances to a step 117.

The step 117 decides whether a call back instruction is present or absent. When the call back instruction is decided to be present, the program advances to the step 107. When the call back instruction is decided to be absent, the program advances to a step 118.

The step 118 decides whether an editing instruction is present or absent. When the editing instruction is decided to be present, the program advances to a step 119. When the editing instruction is decided to be absent, the program returns to the step 117.

The step 119 executes a fourth editing process. Specifically, the step 119 erases a head of the caller telephone number data in the buffer 9. The erased head of the caller telephone number data agrees with the given data representing a prescribed digit, for example, "1". In other words, the step 119 modifies the caller telephone number data in the buffer 9 so as to be equal to the caller telephone number data in the designated area of the memory 5. At the same time, the caller telephone number which is represented by the resultant data in the buffer 9, that is, the modification-resultant caller telephone number, is indicated on the display 7 by the operation of the controller 80. For example, the modification 15 resultant caller telephone number is "123-456-7890" in cases where the preceding caller telephone number is "1-123-456-7890". After the step 119, the program returns to the step 104.

The step 107 closes the telephone line 1 and thereby moves the telephone set into a state at which the telephone set can communicate with the caller in two ways. A step 108 following the step 107 informs the dial signal transmitter 4 of the caller telephone number data in the buffer 9. The step 108 controls the dial signal transmitter 4 so that the dial signal transmitter 4 will generate a dial signal in accordance with the caller telephone number data in the buffer 9, and that the dial signal transmitter 4 will transmit the generated dial signal to the telephone line 1 via the hook switch 2. It should be noted that, in this case, the hook switch 2 is generally closed. After the step 108, the program directly or indirectly returns to the step 102.

Hereinafter, a description will be given of the case where dialing is executed by using data representative of a caller telephone number (for example, 123-456-7890) which is stored in the memory 5. When the user gives an indicating instruction via the input unit 8 (the step 102), the buffer 9 in the editing unit 6 is loaded with caller telephone number data from a first area of the memory 5 (the step 103). At this time, the related caller telephone number is indicated on the display 7. The indicating instruction changes the operation of the editing unit 6 to an editing mode which will be described in the following.

In cases where the caller telephone number indicated on the display 7 agrees with the telephone number of the opposite party (for example, the opposite party corresponding to a telephone number of 123-456-7890) to be dialed and where the user knows this fact and the user thinks that it is unnecessary to edit the telephone number, the user gives a call back instruction. The user's call back instruction is detected by the step 104, and immediately a transmitting process is stated. Specifically, the telephone line 1 is closed (the step 107), and a dial signal is transmitted in accordance with the caller telephone number data in the buffer 9 (the step 108).

In cases where the caller telephone number indicated on the display 7 substantially agrees with the telephone number of the opposite party to be dialed but the user thinks that it is necessary to edit the telephone number, the user presses the push button 10 and thereby gives an editing instruction. When the editing instruction is detected by the step 105, a process of editing the caller telephone number will be executed as described later.

When the user gives an indicating instruction again (the step 106), the contents of the buffer 9 are updated. Specifically, an area of the memory 5 which is subsequent to the previously-accessed area is newly designated (the step 109), and a return to the step 103 is executed. The step 103 loads the buffer 9 with the caller telephone number data from the currently-designated area of the memory 5, and the related caller telephone number is indicated on the display 7. During a subsequent period, each time the user gives an indicating instruction (the step 106), a caller telephone number memorized in the memory 5 is indicated on the display 7.

When the user thinks that it is necessary to edit the caller telephone number and thus the user presses the push button 10, the editing unit 6 executes a process of editing the caller telephone number (for example, 123-456-7890) as follows. Specifically, in the case where a first editing instruction is detected by the step 105 (in the case where the user presses the push button 10), a first editing process is executed (the step 110). The first editing process (the step 110) removes or erases a portion of the caller telephone number data from the buffer 9. The remaining portion of the caller telephone number data represents caller telephone number digits in a given number of successive places starting from the lowest place. The removed portion of the caller telephone number data corresponds to caller telephone number digits in higher places. At the same time, the unremoved portion of the caller telephone number which is represented by the remaining data in the buffer 9, that is, the removal-resultant caller telephone number, is indicated on the display 7. For example, the removal-resultant caller telephone number is "456-7890" in cases where the original caller telephone number is "123-456-7890". The step 111 which follows the step 110 functions to detect a call back instruction given by the user. The step 112 functions to detect a next editing instruction given by the user.

When the step 112 detects an editing instruction (when the user presses the push button 10), a second editing process will be executed next (the step 113). Specifically, the second editing process (the step 113) adds given data to the caller telephone number data in the buffer 9. The added data represents a prescribed digit, for example, "1". The prescribed digit is added to the higher side of the caller telephone number to modify the caller telephone number. At the same time, the caller telephone number which is represented by the resultant data in the buffer 9, that is, the modification-resultant caller telephone number, is indicated on the display 7. For example, the modification-resultant caller telephone number is "1-456-7890" in cases where the preceding caller telephone number is "456-7890". The step 114 which follows the step 113 functions to detect a call back instruction given by the user. The step 115 functions to detect a next editing instruction given by the user.

When the step 115 detects an editing instruction (when the user presses the push button 10), a third editing process will be executed next (the step 116). Specifically, the third editing process (the step 116) clears the caller telephone number data from the buffer 9, and reads out caller telephone number data from the designated area of the memory 5 and writes the readout caller telephone number data into the buffer 9. Then, the third editing process (the step 116) adds given data to the caller telephone number data in the buffer 9. The added data represents a prescribed digit, for example, "1". The prescribed digit is added to the higher side of the caller telephone number to modify the caller telephone number. At the same time, the caller telephone number which is represented by the resultant data in the buffer 9, that is, the modification-resultant caller telephone number, is indicated on the display 7. For example, the modification-resultant caller telephone number is "1-123-456-7890" in cases where the preceding caller telephone number is "123-456-7890". The step 117 which follows the step 116 functions to detect a call back instruction given by the user. The step 118 functions to detect a next editing instruction given by the user.

When the step 118 detects an editing instruction (when the user presses the push button 10), a fourth editing process will be executed next (the step 119). Specifically, the fourth editing process (the step 119) erases a head of the caller telephone number data in the buffer 9. The erased head of the caller telephone number data agrees with the given data representing a prescribed digit, for example, "1". In other words, the fourth editing process (the step 119) modifies the caller telephone number data in the buffer 9 so as to be equal to the caller telephone number data in the designated area of the memory 5. At the same time, the caller telephone number which is represented by the resultant data in the buffer 9, that is, the modification-resultant caller telephone number, is indicated on the display 7. For example, the modification-resultant caller telephone number is "123-456-7890" in cases where the preceding caller telephone number is "1-123-456-7890".

During a subsequent period, each time an editing process is given by the user, one of the first, second, third, and fourth editing processes is sequentially and periodically executed and also the indication of the resultant caller telephone number is executed.

The user executes such editing processes while monitoring the caller telephone number indicated on the display 7. When the caller telephone number indicated on the display 7 comes into agreement with the desired telephone number as a result of the editing processes, the user issues a call back instruction. In the case where a user's call back instruction is detected by the step 111, the step 114, or the step 117, a transmitting process similar to the previously-mentioned transmitting process is executed. Separating the hand set 11 from the main body 90, that is, closing the hook switch 2, is used and detected as the issue of a user's call back instruction. When the hand set 11 is separated from the main body 90, the hook switch 2 is closed and thus the telephone line 1 is closed (the step 107). Then, the caller telephone number data which is currently stored in the buffer 9 is transmitted to the dial signal transmitter 4, and the dial signal transmitter 4 transmits a dial signal (dial data) to the telephone line 1 in accordance with the caller telephone number data (the step 108).

This embodiment may be modified in various ways as described hereinafter. According to a first modification, the total number of different editing processes is set different from four. In a second modification, the sequence of the execution of the first, second, third, and fourth editing processes can be changed by operating the input device 8. In a third modification, a first user's indicating instruction and a change to the editing mode are given by depressing the push button 10. Thus, in modes other than the editing mode, the depression of the push button 10 is recognized as an indicating instruction and a requirement for a change to the editing mode. In the editing mode, the editing process is started by depressing the push button 10. In the third modification, since the push button 10 can be used for different purposes, the number of necessary buttons is relatively small. A fourth modification includes an additional memory different from the memory 5 and the buffer 9. The edited caller telephone number data is registered in the additional memory, and the registered caller telephone number data can be used as telephone number data in a later automatic dial signal transmission process. Specifically, the caller telephone number data is transferred from the buffer 9 to the additional memory in accordance with user's registering operation. During a later period, when the user actuates the key arrangement 13 to execute the automatic dialing process, the corresponding edited telephone number data is read out from the additional memory and thus the automatic dialing process is actually executed in response to the edited telephone number data.

What is claimed is:

1. A telephone set comprising:
   means for detecting first telephone number data coming from a telephone line;
   means for storing the first telephone number data detected by the telephone number detecting means;
   means for editing the telephone number data stored in the storing means into second telephone number data, wherein the editing means comprises means for automatically presenting a series of predetermined editing processes having respective predetermined contents for selection by an operator, selecting means for selecting at least one of the predetermined editing processes, and means for executing editing processes selected by the selecting means without requiring the operator to input information of contents of the executed editing processes;
   means for indicating the first and second telephone number data stored in the storing means; and
   means for generating a dial signal corresponding to the second telephone number data, and for transmitting the dial signal to the telephone line.

2. A telephone set comprising:
   a buffer memory for storing first telephone number data;
   instruction means for inputting an editing instruction;
   means for editing the first telephone number data stored in the buffer memory into second telephone number data, wherein the editing means comprises means for automatically presenting a series of predetermined editing processes having respective predetermined contents to an operator for selection, and means for executing one of the editing processes without requiring the operator to input information of contents of the executed editing process in response to an editing instruction inputted by the instruction means;
   means for indicating a telephone number represented by each of the first and second telephone number data stored in the buffer memory; and
   means for generating a dial signal corresponding to the second telephone number data edited by the editing means, and for transmitting the dial signal to a telephone line.

3. The telephone set of claim 2, further comprising means for saving the second telephone number data stored in the buffer memory.

4. A telephone set comprising:
   means for detecting first telephone number data coming from a telephone line;
   data storing means for storing the first telephone number data detected by the telephone number detecting means;
   input means for inputting an editing instruction;
   a buffer memory;
   editing means for, in an editing mode, loading the buffer memory with the first telephone number data stored in the data storing means and editing the first telephone number data stored in the buffer memory into econ telephone number data, wherein the editing means includes means for automatically presenting a series of predetermined editing processes with respective predetermined contents to be performed on the first telephone number data loaded in the buffer memory to an operator for selection in response to an editing instruction inputted by the input means, wherein the editing means includes means for removing a portion of the first telephone number data in the buffer memory in accordance with a first one of the editing processes without requiring the operator to input information of contents of the first one of the editing processes, wherein an unremoved portion of the first telephone number data in the buffer memory corresponds to first telephone number digits in a given number of successive places starting from a lowest place while the removed portion of the telephone number data in the buffer memory corresponds to telephone number digits in other places;
   means for indicating a telephone number represented by each of the first and second telephone number data stored in the buffer memory; and
   means for generating a dial signal corresponding to the second telephone number data, and for transmitting the dial signal to the telephone line in response to a dial signal transmitting instruction.

5. The telephone set of claim 4, wherein the editing means comprises means for adding given digit data to a head of the first telephone number data in accordance with a second one of the editing processes without requiring the operator to input information of contents of the second one of the editing processes.

6. A telephone set comprising:
   means for detecting first telephone number data coming from a telephone line;
   data storing means for storing the first telephone number data detected by the telephone number detecting means;
   input means for inputting an editing instruction;
   a buffer memory;
   editing means for, in an editing mode, loading the buffer memory with the telephone number data stored in the data storing means and editing the first telephone number data stored in the buffer memory into second telephone number data, wherein the editing means includes means for automatically presenting a series of predetermined editing processes with respective predetermined contents to be performed on the first telephone number data loaded in the buffer memory to an operator for selection in response to an editing instruction inputted by the input means, wherein the editing means includes means for adding given digit data to a head of the first telephone number data stored in the buffer memory in accordance with one of the editing processes without requiring the operator to input information of contents of the first one of the editing processes;
   means for indicating a telephone number represented by each of the first and second telephone number data stored in the buffer memory; and
   means for generating a dial signal corresponding to the second telephone number data, and for transmitting the dial signal to the telephone line in response to a dial signal transmitting instruction.

7. A telephone set comprising:

means for detecting first telephone number data coming from a telephone line;
data storing means for storing the first telephone number data detected by the telephone number detecting means;
input means for inputting an indicating instruction;
a buffer memory for storing telephone number data received from the data storing means;
editing means for, in an editing mode, loading the buffer memory with the first telephone number data stored in the data storing means in accordance with an indicating instruction inputted by the input means and for editing the first telephone number data stored in the buffer memory into second telephone number data, wherein the editing means includes means for automatically presenting a series of predetermined editing processes with respective predetermined contents to be performed on the first telephone number data loaded in the buffer memory to an operator for selection in response to an editing instruction inputted by the input means;
means for indicating a telephone number represented by each of the first and second telephone number data stored in the buffer memory; and
means for generating a dial signal corresponding to the second telephone number data, and for transmitting the dial signal to the telephone line in response to a dial signal transmitting instruction.

8. The telephone set of claim 7, further comprising means for saving the second telephone number data stored in the buffer memory.

9. A telephone set comprising:
means for detecting first telephone number data coming from a telephone line;
data storing means for storing the first telephone number data detected by the telephone number detecting means;
input means for inputting an indicating instruction;
means for editing the telephone number data into second telephone number data, wherein the editing means comprises means for automatically presenting a series of predetermined editing processes having respective predetermined contents to an operator for selection by a selecting means in response to an editing instruction inputted via the input means, and means for executing editing processes selected by the selecting means without requiring the operator to input information of contents of the executed editing processes;
a buffer memory for storing first and second telephone number data;
means for indicating a telephone number represented by each of the first and second telephone number data stored in the buffer memory; and
means for generating a dial signal corresponding to the second telephone number data, and for transmitting the dial signal to the telephone line in response to a dial signal transmitting instruction;
wherein the editing means further comprises first sub means for loading the buffer memory with the first telephone number data stored in the data storing means and performing a change to an editing mode in accordance with an indicating instruction inputted via the input means, second sub means for removing a portion of the first telephone number data in the buffer memory, wherein an unremoved portion of the first telephone number data in the buffer memory corresponds to telephone number digits in a given number of successive places starting from a lowest place while the removed portion of the first telephone number data in the buffer memory corresponds to telephone number digits in other places, third sub means for adding given digit data to a head of the telephone number data which remains in the buffer memory after the removing function by the second sub means, fourth sub means for adding given digit data to a head of the telephone number data which is stored in the buffer memory before the removing function by the second sub means, fifth sub means for returning the telephone number data in the buffer memory which is processed by the functions of the second, third, and fourth sub means to the data which occurs before the execution of the functions of the second, third, and fourth sub means, and a sixth sub means for sequentially executing the functions of the second, third, fourth, and fifth sub means.

10. The telephone set of claim 9, further comprising means for saving the second telephone number data stored in the buffer memory.

11. A telephone set comprising:
means for detecting a caller telephone number from an incoming signal;
means for storing the caller telephone number detected by the detecting means;
means for reading out the caller telephone number from the storing means; and
means for editing the readout caller telephone number by at least two digits at once, wherein the editing means comprises means for automatically presenting a series of predetermined editing processes having respective predetermined contents to an operator for selection by a selecting means, and means for executing editing processes selected by the selecting means without requiring the operator to input information of contents of the executed editing processes.

12. The telephone set of claim 11, further comprising means for indicating the caller telephone number which is being edited by the editing means.

13. A telephone set comprising:
means for detecting a caller telephone number from an incoming signal; and
means for editing the detected caller telephone number by at least two digits at once, wherein the editing means comprises means for automatically presenting a series of predetermined editing processes having respective predetermined contents to an operator for selection by a selecting means, and means for executing editing processes selected by the selecting means without requiring the operator to input information of contents of the executed editing processes.

14. The telephone set of claim 13, further comprising means for indicating the caller telephone number which is being edited by the editing means.

15. A telephone set comprising:
means for detecting a caller telephone number from an incoming signal;
means for storing the caller telephone number detected by the detecting means;
means for reading out the caller telephone number from the storing means; and
means for editing the readout caller telephone number, wherein the editing means comprises means for automatically presenting a series of predetermined editing processes with respective predetermined contents to an operator for selection by activation of an operator control, and means for executing editing processes selected by the activation of the operator control without requiring the operator to input information of contents of the executed editing processes.

* * * * *